US005422149A

United States Patent [19]

Dreher

[11] Patent Number: 5,422,149

[45] Date of Patent: Jun. 6, 1995

[54] MATERIAL HAVING ARTIFICIAL QUILL MARKS

[75] Inventor: John Dreher, Chatham, N.J.

[73] Assignee: Dreher Industries Ltd., Newark, N.J.

[21] Appl. No.: 890,929

[22] Filed: May 29, 1992

[51] Int. Cl.[6] .................... B32B 3/00

[52] U.S. Cl. .................... 428/15; 428/151; 428/161; 428/173; 428/473; 428/540

[58] Field of Search .................... 428/173, 15, 161, 151, 428/473, 904, 540; 427/389; 264/316

[56] References Cited

U.S. PATENT DOCUMENTS 1,372,192 4/1920 Rausch .................... 428/173
4,797,315 1/1989 Balmer et al. .................... 428/167
4,816,319 3/1989 Dees et al. .................... 428/167
4,894,275 1/1990 Pelzer .................... 428/166
5,232,764 8/1993 Oshima .................... 428/173

*Primary Examiner*—D. S. Nakarani
*Assistant Examiner*—H. Thi Le
*Attorney, Agent, or Firm*—Lerner, David, Littenberg, Krumholz & Mentlik

[57] ABSTRACT

Natural and artificial animal skins are provided with randomly spaced protuberances which simulate natural quill marks of ostrich skins. The protuberances are created from die formed depressions into which is adhered an individual glob of hot melt material. The glob has a generally semi-spherical mass extending above the inner surface of the animal skin. During manufacture of articles therefrom, the globs have the tendency to accentuate the appearance of the quill marks.

13 Claims, 2 Drawing Sheets

MATERIAL HAVING ARTIFICIAL QUILL MARKS

BACKGROUND OF THE INVENTION

The present invention relates in general to both natural and artificial materials useful in the production of manufactured goods, and more specifically, to animal skins having artificial quill marks simulating natural quilled ostrich skin and the like, as well as a method of making same.

Natural animal skins such as ostrich, pig, deer and the like have been used for many years in the manufacture of various personal items such as wallets, pocketbooks, shoes, boots, key cases and the like. Natural animal skins have enjoyed great popularity due to their aesthetic appeal and perception of high quality, thereby commanding a high price for the finished goods.

Ostrich skin in particular has enjoyed a great deal of popularity due to its unique appearance resulting from the presence of quill marks which provide the finished goods with a distinctive appearance. To this end, only approximately 50 percent of natural ostrich skin contain quill marks. Although the non-quilled portion of the ostrich skin is also desirable in the manufacture of the aforementioned finished goods, these products do not command the same premium selling price. It is therefore desirable to create artificial quill marks in the non-quilled portion of an ostrich skin, or other suitable animal skin such as pig, so as to provide for the more desirable quilled appearance.

To this end, there is known the artificial quilling of animal skins by creating random shallow depressions using a die and counter arrangement to form protrusions which simulate ostrich quill marks. In constructing manufactured goods from these materials, the skin is stretched taut which has the tendency to flatten the quill-like protrusions. As a result, the aesthetic value of the resulting product is greatly diminished.

There has been known one unsuccessful attempt to overcome this problem by applying a continuous uniform backing layer of rigid thermosetting material over the surface of the animal skin containing the depressions. The resulting quilled material was, however, found unacceptable for use in manufacturing finished goods therefrom. Specifically, the backing layer inhibited the ability of the animal skin to be stretched during the manufacture of articles therefrom. In addition, during the bending or shaping of the skin to conform to the article's shape, the backing layer would crack and flake from the skin. Further, the depressions created during the die stamping process are relatively shallow. It is therefore desirable to provide a means for accentuating these depressions during the manufacture of articles to create more realistic looking quill marks. The use of a continuous uniform backing layer was found incapable of achieving this result.

Accordingly, it can be appreciated that there is still an unsolved need for a material such as natural and artificial animal skin having artificial quill marks formed therein and method of making same which overcomes the above noted disadvantages and drawbacks of the previously known material and process therefore.

SUMMARY OF THE INVENTION

A material having artificial quill marks constructed from a layer of material having opposing surfaces, a plurality of depressions created in the material from one surface thereof, the depressions forming artificial quill marks projecting from the other surface of the material, and individual means within the depressions for each forming a protrusion on the one surface of the material.

An animal skin having artificial quill marks constructed from a layer of animal skin having opposing surfaces, a plurality of depressions created in the animal skin from one surface thereof, the depressions forming artificial quill marks projecting from the other surface of the animal skin, and individual globs of material within the depressions each forming a protrusion on the one surface of the animal skin, the globs being separated from adjacent globs by a portion of the animal skin.

A method of making a material having artificial quill marks includes the steps of creating a plurality of depressions in the material from one surface thereof, the depressions forming artificial quill marks projecting from the other surface of the material, and filling the depressions with individual globs each forming protrusions on the one surface of the material.

BRIEF DESCRIPTION OF THE DRAWINGS

The above description, as well as further objects, features and advantages of the present invention will be more fully understood with reference to the following detailed description of a material having artificial quill marks and method of making same, when taken in conjunction with the accompanying drawings, wherein.

DETAILED DESCRIPTION

Figure 1:
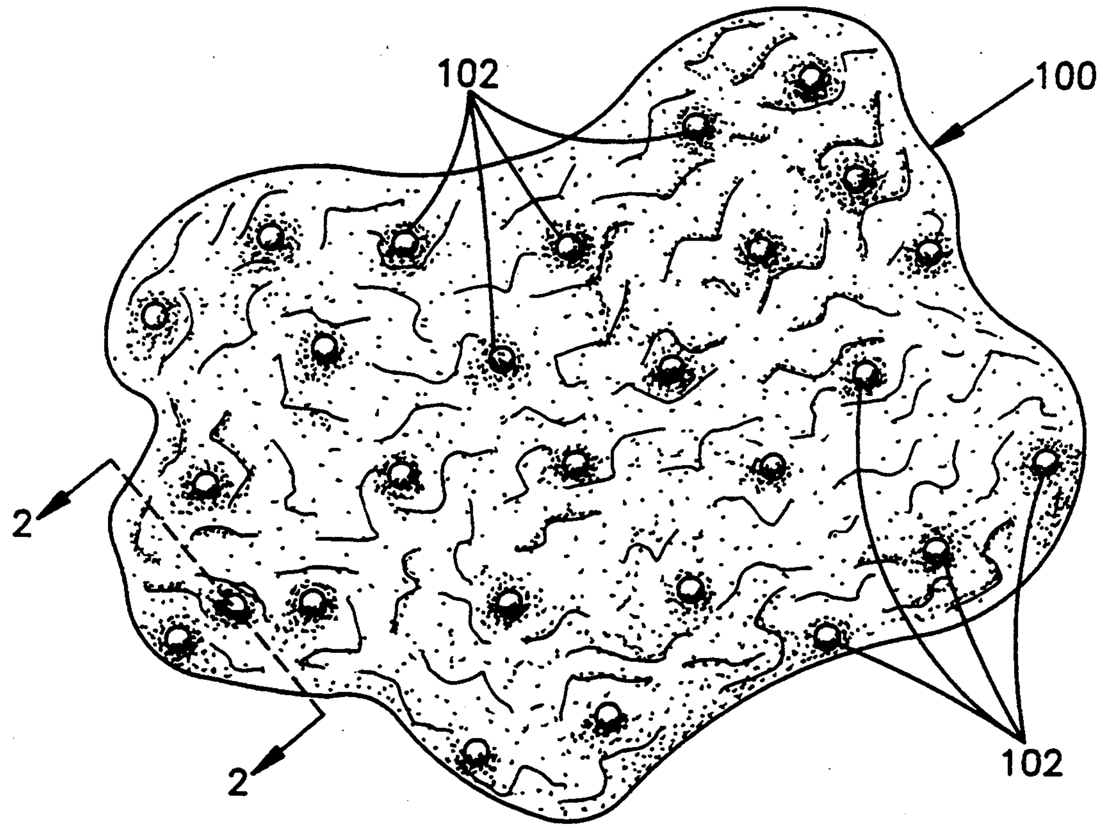
FIG. 1 is a perspective view of a layer of an animal skin having artificially created quill marks pursuant to the present invention.

Turning now to the drawings wherein like reference numerals represent like elements, there is shown in FIG. 1 a layer of material 100 having randomly distributed artificial quill marks 102 created therein pursuant to the present invention. For quality and aesthetic reasons, it is preferred that the material 100 be natural animal skins, such as non-quilled ostrich, pig, deer or the like. However, it is to be understood that a number of manmade materials which simulate natural animal skins and leathers may be used, for example, polyurethane material and the like. Thus, it can be appreciated that a variety of materials 100 may be used to include the decorative appearance of artificial quill marks 102 pursuant to the present invention as now to be described.

Figure 2:
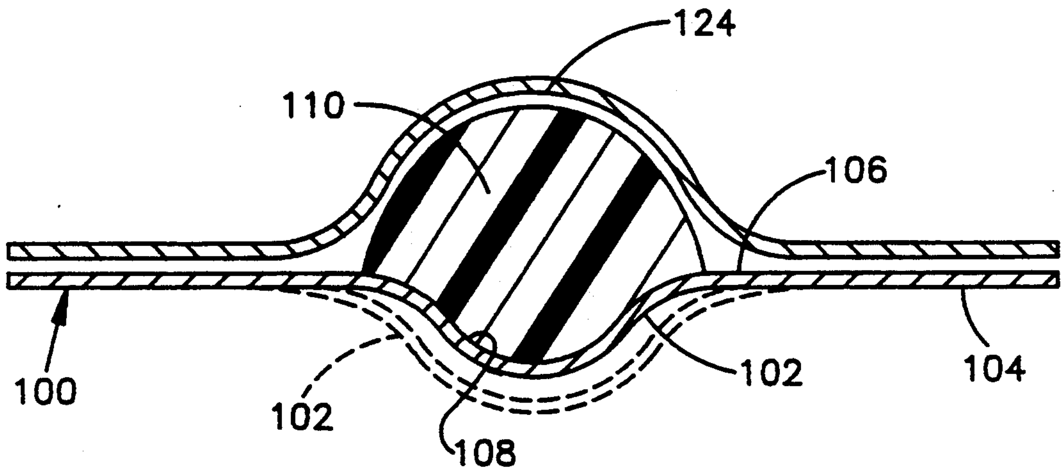
FIG. 2 is a cross-sectional view taken along line 2—2 in FIG. 1 showing individual globs adhered within a depression creating an artificial quill mark pursuant to the present invention.

Referring now to FIG. 2, there is shown in cross-section an artificial quill mark 102 created in accordance with the present invention. The material 100, by way of example, has a generally smooth outer surface 104 and a generally roughened inner surface 106. Randomly formed within the inner surface 106 throughout the extent of the material 100 is a plurality of generally circular spaced depressions 108. These depressions 108 result in the quill marks 102 being in the form of an irregular protrusion on the outer surface 104 of the material 100. The depressions 108 are sized, shaped and arranged in the material 100 so as to simulate the appearance of natural quill marks in ostrich skin.

Adhered within each of the depressions 108 is a glob 110 which may be formed either in situ or as a separately molded element. In this regard, the glob 110 may be formed in situ by injection or extrusion from hot melt material which will adhere to the inner surface 106 of the material 100 within each depression 108. The globs 110 may be formed from a variety of hot melt materials, as well as other suitable polymer materials which will form a rigid or semi-rigid glob, preferably having a degree of resiliency. In accordance with one embodiment, the polymer material for forming the globs 110 is obtained from Thermogrip of Canada, Catalog No. 236. It is also contemplated that the globs 110 may be individually pre-molded, and then individually adhesively bonded within each depression 108.

In either event, the effective height of each glob 110 is substantially greater than the maximum depth of each depression 108. This results in the glob 110 extending well above the inner surface 106 of the material 100, and to a greater degree than the initial projecting extent of each quill mark 102 from the outer surface 104. As shown, that portion of the glob 110 extending above the inner surface 106 of the material 100 has a generally semi-spherical profile. The diameter of the glob 110 may either conform substantially to the effective diameter of the depression 108, or be slightly larger as illustrated. As a result of the use of individual globs 110, the globs are separated from adjacent globs by large portions of the material 100. This results in the material 100 retaining its flexibility and stretchability. Although the present invention has been described with respect to the use of globs 110, it is to be understood that other equivalent structures and shapes may be employed without departing from the scope of the present invention.

Figure 3:
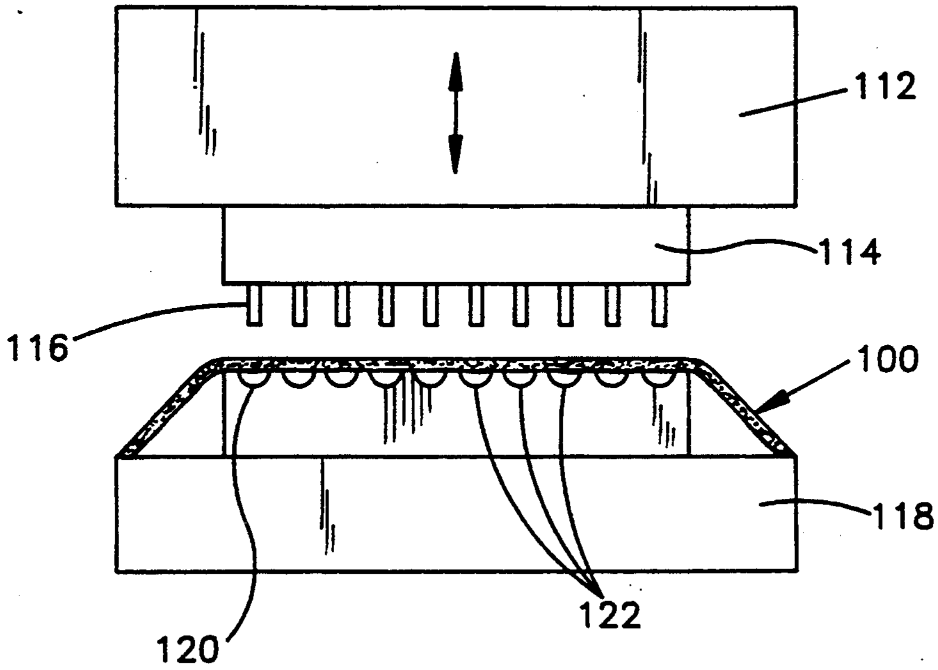
FIG. 3 is a diagrammatic sketch of an apparatus for use in creating artificial quill marks in a layer of material pursuant to the method of the present invention.

The depressions 108 are created in a manner as best shown in FIG. 3. A press 112 is fitted with an embossing plate die 114 having a plurality of projections 116 which are used in creating the individual shaped depressions 108. Opposing the die 114 is a base 118 which supports a counter 120 having a plurality of shaped recesses 122 arranged in alignment with each of the projections 116. The recesses 122 are shaped to conform to the shape of the quill mark 102 to be produced.

A layer of material 100 is positioned overlying the counter 120 with its outer surface 104 facing the shaped recesses 122. A single stroke of the press 112 causes each of the projections 116 to force a portion of the material 100 into the shaped recesses 122 to produce the quill marks 102. A die 114 suitable for producing quill marks is obtainable from Standard Embossing Plate Manufacturing Co. of Newark, N.J.

Once the depressions 108 have been created, the individual globs 110 are formed in situ using suitable means, such as a hot melt gun or automatic material dispenser via extrusion or injection through one or more nozzles aligned with the depressions. In addition, preformed globs 110 may be adhesively bonded within each depression 108 as opposed to being formed in situ. As a final step, a secondary layer 124 of less expensive animal skin or fabric material may be adhered overlying the inner surface 106 of the material 100 and each of the globs 110.

Figure 4:
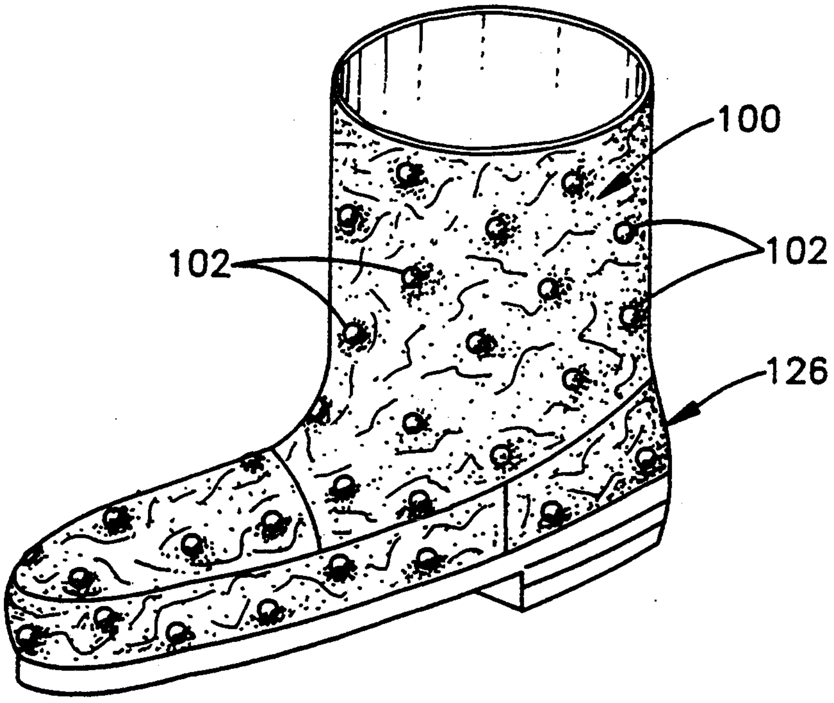
FIG. 4 is a perspective view of a finished article in the nature of a boot manufactured using the material of the present invention having artificially created quill marks.

Referring now to FIG. 4, there is shown a finished article of manufacture formed from the material 100 having the artificial quill marks 102. Specifically shown is a boot 126. The material 100 is last into the desired shape by stretching and conforming the material 100 as desired. During this manufacturing process, as the material 100 is stretched taut over the boot last, the globs 110 are pressed outwardly in a manner which accentuates the extent of the quill marks 102. In other words, the final quill marks project outwardly in the finished article to a greater extent than the originally formed depression 108 as shown by the dashed lines in FIG. 2. This results directly from the provision of the globs 110 within each depression 108. Although the material 100 has been described in the manufacture of a boot 126, it is to be understood that other articles may be constructed therefrom. For example, other useful articles include shoes, pocketbooks, wallets, briefcases and the like. Thus, there is no extent for the applicability of the material 100 having artificial quill marks 102.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. An article having artificial quill marks comprising a layer of material having opposing surfaces, a plurality of depressions created in said material from one surface thereof, said depressions forming said artificial quill marks projecting from the other surface of said material and individual means within said depressions for forming and maintaining a protrusion of said artificial quill marks on said other surface of said material, said individual means including globs separated from adjacent globs by said layer of material, said globs being adhesively bonded within said depressions.

2. The article of claim 1, wherein said globs comprise plastic material.

3. The article of claim 1, wherein said globs include a diameter substantially corresponding to the diameter of said depressions.

4. The article of claim 1, wherein said globs include a diameter greater than the diameter of said depressions.

5. The article of claim 1, wherein said layer of material comprises ostrich or pigskin.

6. The article of claim 1, wherein said globs have a height above said one surface of said material greater than the depth of said depressions.

7. The article of claim 1, wherein said layer of material is a continuous uninterrupted layer.

8. An animal skin having artificial quill marks comprising a layer of animal skin having opposing surfaces, a plurality of depressions created in said animal skin from one surface thereof, said depressions forming artificial quill marks projecting from the other surface of said animal skin, and individual globs of material within said depressions for forming and maintaining a protrusion of said artificial quill marks on said other surface of said animal skin, said globs being separated from adjacent globs by said animal skin, said globs being adhesively bonded in said depressions.

9. The animal skin of claim 8, wherein said globs have a diameter substantially corresponding to the diameter of said depressions.

10. The animal skin of claim 8, wherein said globs have a diameter greater than the diameter of said depressions.

11. The animal skin of claim 8, wherein said globs comprise elements of plastic material having a substantially spherical shape.

12. The animal skin of claim 8, wherein the height of said globs above said one surface of said animal skin is greater than the depth of said depressions.

13. The animal skin of claim 8, wherein said animal skin is a continuous uninterrupted skin.

* * * * *